United States Patent [19]
Sheath et al.

[11] 3,994,763
[45] Nov. 30, 1976

[54] METHOD OF MAKING A DECORATIVE ARTICLE CONTAINING ENCAPSULATED MATERIAL

[76] Inventors: Robert Sheath; Cristull Sheath, both of 4208-15A St., SW., Calgary T2T 4C9, Alberta, Canada

[22] Filed: Feb. 6, 1975

[21] Appl. No.: 547,455

[52] U.S. Cl. .............................. 156/182; 156/246; 156/267; 264/1; 264/90; 264/135; 264/157; 264/161; 264/162; 264/214; 264/219; 264/255; 264/261; 264/271; 264/291; 264/313; 264/331
[51] Int. Cl.² ................. B29C 6/00; B29C 27/00; B29D 3/00; B29D 9/00
[58] Field of Search ............. 264/90, 101, 102, 245, 264/299, 319, 338, 162, 129, 157, 261, 271, 73, 313, 161, 255, 267, 134, 135, 291, 219, 1; 249/112; 428/13, 14; 427/290; 156/99, 245, 102, 246, 107, 212, 242, 267

[56] References Cited
UNITED STATES PATENTS

| | | | |
|---|---|---|---|
| 1,915,936 | 6/1933 | Loomis | 264/157 |
| 2,300,495 | 11/1942 | Gerhart | 428/13 |
| 2,368,085 | 1/1945 | Barbieri | 264/162 |
| 2,613,397 | 10/1952 | Borkland | 264/338 |
| 2,636,422 | 4/1953 | Pierson | 249/112 |
| 2,832,094 | 4/1958 | Groth | 264/90 |
| 3,257,484 | 6/1966 | Barnette | 264/261 |
| 3,281,259 | 10/1966 | Lux et al. | 427/290 |
| 3,306,956 | 2/1967 | Barnette | 264/261 |
| 3,499,954 | 3/1970 | Trojan et al. | 264/90 |
| 3,596,317 | 8/1971 | Nicholson | 264/271 |

Primary Examiner—Willard E. Hoag
Attorney, Agent, or Firm—Fidelman, Wolffe & Waldron

[57] ABSTRACT

Method of making a sculptured plastic encasement with curved transparent optical quality front and rear faces formed by separately casting each face, then encasing an object within one of the face castings. Afterward on each casting a flat open to the air surface is formed and thereafter the flat surfaces are laminated together. The unitary casting is then trimmed to size, in a way which leaves roughened edge surfaces that can hold a tint.

The encasement is made from room temperature curing transparent resin, and the object encased may be a scene sculpted from fragile materials like grass, seeds, etc.

5 Claims, 3 Drawing Figures

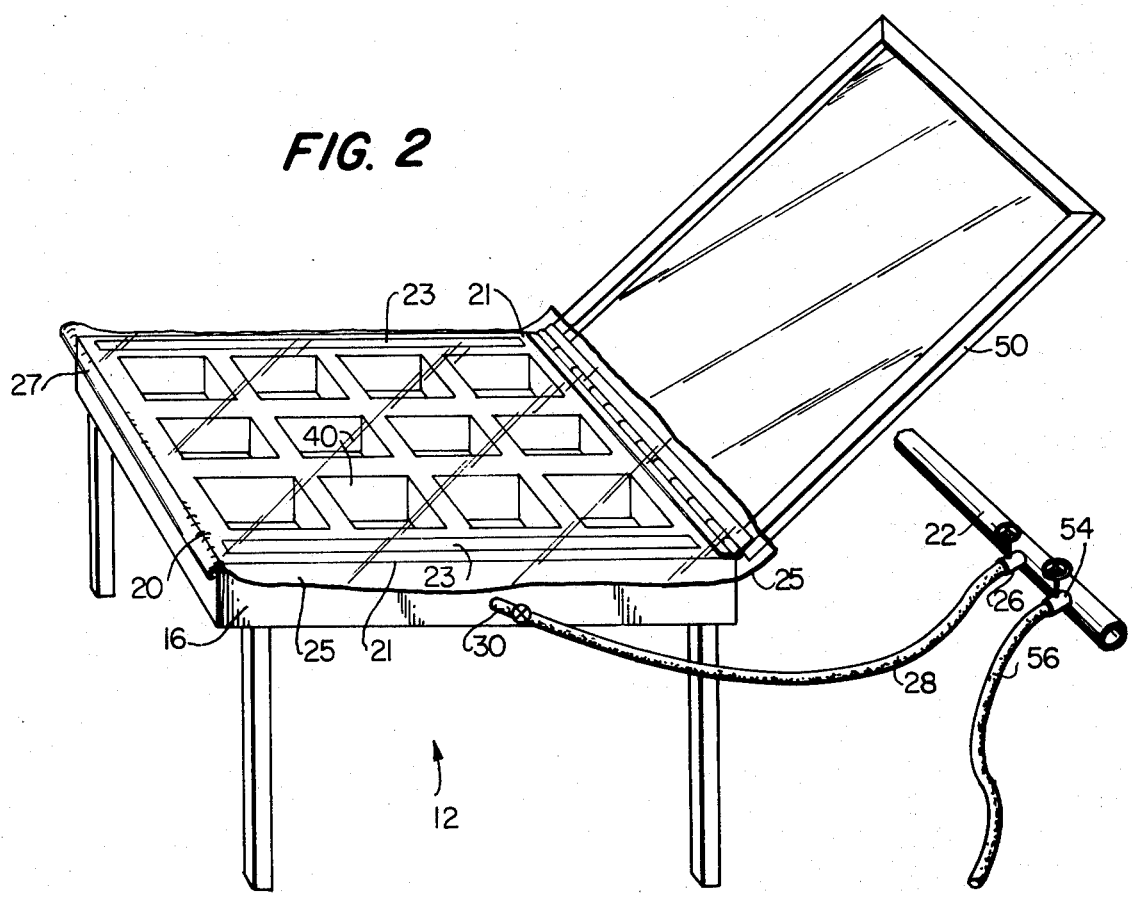
FIG. 2
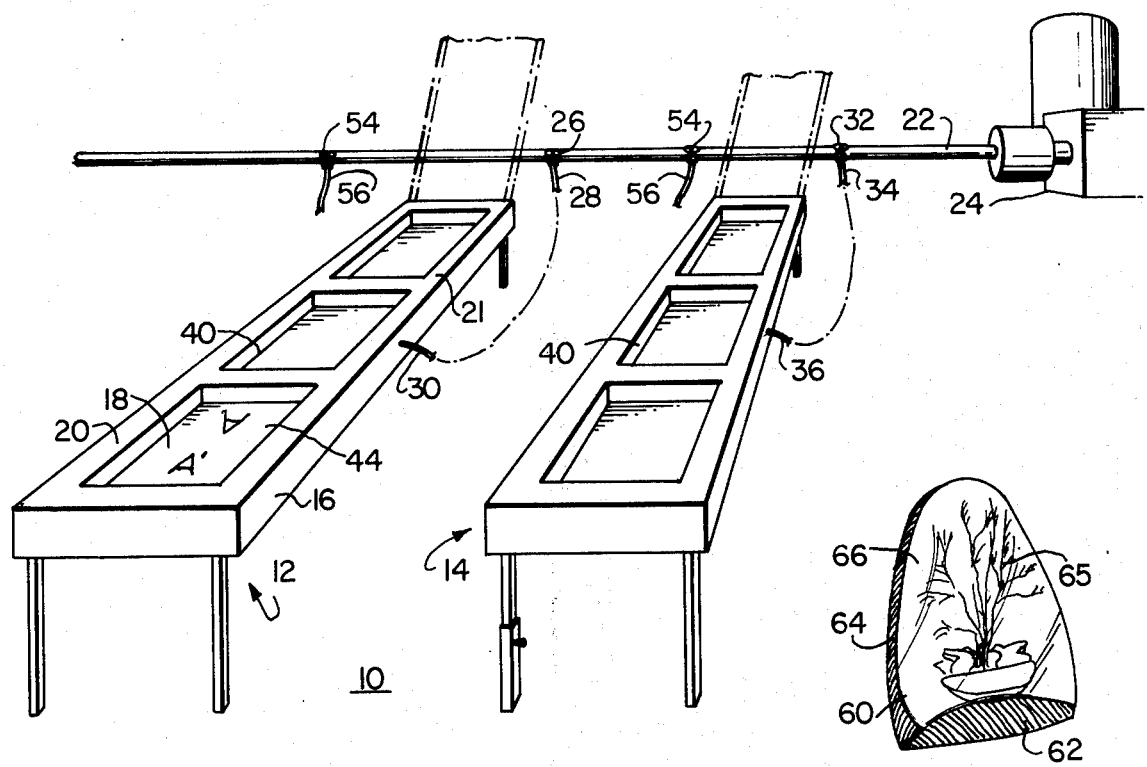
FIG. 1
FIG. 3

METHOD OF MAKING A DECORATIVE ARTICLE CONTAINING ENCAPSULATED MATERIAL

INTRODUCTION

This invention relates to a mass production method for forming art objects, and more particularly to the formation of a sculptured, essentially transparent molded plastic encasement for attractive objects such as a three-dimension scene, the whole being intended as an art object.

BACKGROUND OF THE INVENTION

The advent of transparent plastic materials that may be cast has given rise to a form of art object consisting of commonplace articles such as coins encased in a transparent block. In addition, such encasement may be employed for preservation of fragile objects. Room temperature setting transparent resins now available to the art allows encasement of thermally sensitive objects. Now it is possible to form a scene from natural materials like grass, seeds, twigs and the like, then encase the scene. The scene may be of fragile, thermally sensitive materials, and need not be self-supporting. The composite of encased and encasement may be an attractive art object.

SUMMARY OF THE INVENTION

Briefly stated, the present invention involves a sculpture comprising a molded essentially transparent plastic encasement tinted to enhance the beauty of an encased artistic article, which for example may be an aquatic or woodland three-dimensional scene.

This invention also involves the method for encasing fragile sculptures and for forming the completed sculptured encasement.

According to practice of this invention, each face of the plastic encasement is separately cast into sculptured form against a film and after curing the resin, removal of the film leaves an optical quality transparent face. The art object encased is placed on the resin layer, then carefully sealed inside the resin by a second, third, fourth, etc. (as necessary) pour of resin casting thereby enough resin to completely immerse the art object within the sculpture casting volume. Then the front and rear faces are laminated in place to produce a unitary optical quality plastic block. The embedment encased in the plastic block is visible through the transparent faces. The side edge surfaces of the block are sawn or ground to shape, leaving a rough surface, and the top sides and/or the bottom edge surface stained or inked. As a result, the entire sculpture is tinted a color corresponding to the color placed on the periphery surface, even though the front and back faces are clear.

Aquatic and prairie scenes made from grass, seeds, bits of wood, etc., ca be encased readily; blue or gold tinting achieve a striking visual simulation of the intended simulation.

DETAILED PRACTICE OF THE INVENTION

Practice of the method of the present invention is largely a multi-step operation which can be carried out by an individual artist by hand with easy to construct equipment. Advantageously, a multiplicity of sculptured encasements may be made simultaneously, thereby multiplying the artist's output. A preferred embodiment of the procedure and the final sculptured encasement can best be described in connection with the attached drawing wherein:

FIG. 1 diagrammatically illustrates the equipment as a whole;

FIG. 2 is an enlarged view of the casting table; and

FIG. 3 diagrammatically illustrates a sculptured encasement.

The molding or casting system 10 comprises a pair of casting tales 12,14 which may be identical. The casting table 12 or 14 is an enclosed box (e.g. 6 feet × 3 feet × 6 feet) with sides 16 and bottom 18 and a top 20 hereinafter described. A vacuum line 22 and pump 24 applies vacuum to the interior of table 12 by way of tap valve 26 hose 28 and outlet 30. Tap valve 32, hose 34 and outlet 36 are the evacuating connections to table 14.

The table top 20 is provided with a multiplicity of (cut-out) openings 40, each of which is sized and shaped in relation to the sculpture article to be cast therein. Desirably the individual opening is sized and shaped for forming and casting two articles in a bottom to bottom mirror image relation. Desirably, the table top 20 is provided with a relatively wide margin 21 (e.g. 2 inches–4 inches) at the periphery so that strips of a two sided adhesive tape 23 may be laid on the table top adjacent the longitudinally elongated side edge.

Desirably (but optionally), each table has a lid 50 provided with a sealing lip 52 and vacuum connection made up of tap valve 54, hose 56 and an outlet valve (not shown).

The casting tables serve as permanent mold patterns for practice of this invention, which in detail is as follows:

1. Run double-sided (2 inches) adhesive tape 23 at opposing side margin 21 of table top 20, then stretch a self-supporting film 25 (e.g. 3–6 mil polyvinyl alcohol) over the surface of each table top 20. The tape adhesive suffices to retain the film, and stretching of the film causes the unsupported sides 27 of the film to curl up and form a side border.

2. Pour a room temperature curing resin over the film to form a relatively thin layer thereon, e.g. 0.5 cm then allow sufficient time for the resin to partially gel (e.g. 15 minutes) and thereafter draw sufficient vacuum from beneath the frame to make the film bow down into the cut-outs or molds 40 as desired. Suitably, the one frame 12 may be drawn down about 4 cm (for the backs) and the other frame 14 drawn down about 1 or 1½cm for the fronts of the sculptured encasement.

3. Thereafter an article or scene (to be encased) is placed on and in the resin layer (inside each mold) while the resin is still somewhat soft. The embodiments will stick to the jelly-like surface and be retained in position. Desirably two scenes are laid on their back side into each mold in the bottom to bottom mirror image relation as shown for embedments A,A' in mold 44. Normally the scene or article embedding is entirely conducted on one of the frames, e.g. in frame 12 using the backs.

4. As an optional step desirable when ambient conditions create a warm humid atmosphere, lids 50 are lowered on the tables 12,14 and vacuum is drawn through the lid 50 in order to facilitate curing or hardening the plastic into an optically clear material.

5. After the embedments have been laid in and the resin allowed to cure a second resin pour is made on each table with enough used on the backs in table 12 to go about half way up the mold cavity. The second pour resin made on the fronts in table 14 fills the mold cavity. Then the pours are allowed to harden and cool (e.g. for 3 hours). Lids 50 may be used.

6. A third pour is made in the backs on table 12 using enough resin to slightly overflow the mold cavities. Then the pour is allowed to harden and cool (e.g. for 3 hours). Lid 50 may be used. The number of pours may be larger if the resin cures exothermically.

7. The vacuum on table 12 is broken, and the sheet of cured plastic with the backs is peeled away from the film. The sheet is cut into sections e.g. 2, 4, 8, etc., for convenient handling, and some of the excess resin at the sides of each section trimmed off.

8. A last pour is made on table 14 on the fronts, then in turn, each section of pre-cut backs is carefully laid with flat face down on the wet fronts taking care to achieve a bubble free matching and lamination of a back to a front throughout table 14. Then the resin is allowed to harden and cool.

9. After the fronts and backs have solidified together the joined sheets may be removed from the table and severed into individual sculptured encasements.

Ordinarily, each casting mold will contain two embedments as is shown for mold 41. Cutting the casting along the center line 43 separates the encasements while creating a free standing base 62 on which each sculptured encasement 60 may stand. Desirably, a roughened base surface is created when the casting is cut, e.g. by rough grinding the base.

The individual sculptured encasements 60 may now be finished off by rough grindng the side marginal edges 64 into any desired final shape, e.g. circular, eliptical, etc., and thickness e.g. ½–1½cm. By shaping cut-out molds 40 according to the ultimate shape of the sculptured encasement the amount of grinding needed to form the side edges desired by the artist can be reduced. However, it is significant to the invention that the side edges be of a roughened texture and that some side surface area be provided.

If the side and/or bottom areas of each sculptured encasement are rough ground a light refracting surface is created. Tinting will cause the color to refract throughout the entire casting. Appropriate coloring enhances the desired artistic effect, blue for water, green for grass, etc. The roughened edge surfaces, side and bottom, will retain tinting pigment permanently. An ink or stain applied to the rough ground side and bottom edges creates a pleasant non-uniform coloring for the sculptured encasement as a whole, lightly tinted at the center, darkest at the edges and the color depends on the viewing angle. To repeat, the color may be consistent with the encased scene, blue for a water fowl scene gold for a prairie scene.

Use of the sculpturing and molding technique of the present invention permits encasement of fragile and impermanent materials. By way of an example, sculptures simulating birds can be formed from seed pods, bits of leaf and grass. Such a sculpture can be most attractive, but certainly is fragile; the materials may not be permanent. However, once the scene has become encased in hard cured resin, the sculptured encasement constitutes a permanent object of art regardless of the otherwise transitory and fragile nature of the materials from which the sculpture has been formed. In addition, background objects such as grass which may not be self-supporting may be laid in readily on the backs being formed in table 12. Ultimately, the cured resin encasement provides ample permanent support. The sculptured shape of the plastic encasement and the tint add to the artistic character of the encased object or scene, making the sculptured encasement as a whole an art object.

A special advantage of this invention is the semi-mass production nature of the method. Although each encased object may be, in and of itself, a hand made unique sculpture, the plastic molding operation produces an entire group of moldings, two for each mold 40, permitting then a simultaneous production of many sculptured encasements.

The molding technique employed herein is adapted to formation of high quality art objects. Room temperature curing resins that form optically clear blocks are known to the art (including for example Koppers polyester Grade 1082-3) as are films that release from the cured resin (including for example polyvinylalcohol). Even so formation of bubble free unwrinkled curved front face and back face surfaces are troublesome. According to practice of this invention, as has already been described, the front face surface 66 is cast on table 14 against film 25 and the back face surface has been cast against the film on table 12 during the first pour. The shape of cut-outs 40 and the degree of vacuum drawn on tables 12 and 14 determine the shapes of the back face and the front face. The film itself has am optical quality finish so that with care (to keep films 25 from wrinkling) optically clear, clean curved faces are formed against the film face.

All working exposed to the air surfaces which exist during the casting operations are transitory and disappear to be inside the final sculptured encasement 60. Careful pouring can avoid bubble formation. Use of lids 50 and curing successive pours under vacuum avoids discoloration blemishes from occuring (inside the sculptured encasement during hot humid weather). Although front face and back face are curved surfaces, the surfaces that are laminated together with the final pour are the flat level surfaces formed on table tops 20 after the final pour on each table.

Overall, the thickness of the sculptured encasement is determined by how much plastic is required to completely encase the scene or other object 65. Principally, this thickness is rear face thickness; the object is closer to the rear face. Normally the rear face curvature is deep to accommodate the object or scene, and the front face curvature is shallow to minimize optical distortions. A curved front face is desirable and is preferred.

What is claimed is:
1. The method of making a decorative article, comprising:
   a. Stretching a plastic film across a cavity in a vacuum table and securing said film to at least two opposed edges of said table about said cavity;
   b. pouring a room-temperature-curing resin onto and covering said film;
   c. allowing said resin to gel, forming a gelled layer;
   d. thereafter applying sufficient vacuum beneath said film to cause said film with said gelled layer thereon to bulge into said cavity;
   e. laying an object to be encapsulated on said gelled layer and pouring sufficient additional resin around said object to encase it beneath a surface of said additional resin and to form a flat surface thereon;
   f. allowing said gelled layer and said additional resin to cure, thereby forming a first cast member having a curved face and a flat rear surface;

g. repeating steps a-c to form a second cast member having a curved face and a flat rear surface;

h. thereafter with additional resin laminating said flat surface of said first and second members, together to form a unitary article;

i. removing excess resin from sides of said article, and roughening edge surfaces thereof, thereby forming said decorative article.

2. The method of claim 1 wherein tinting is applied to roughened edge surfaces.

3. The method of claim 1 wherein each cast member has laid therein two object in bottom to bottom spaced apart relation and wherein creation of edge surfaces includes cutting the unitary casting along a line between said objects, thereby forming two sculptured encasements each with a free standing base thereon.

4. The method of claim 1 wherein at least one layer is cast and cured in stages with each curing stage being done under evacuated conditions.

5. The method of claim 1 wherein a multiplicity of matching front and back faces are each formed on a unitary casting surface whereby the open to the air flat resin surfaces laminated together constitute a pair of sheets having a multiplicity of faces thereon, said faces, front and back, being aligned when lamination takes place; and wherein said laminated sheets are severed into a multiplicity of sculptured encasements.

* * * * *